United States Patent Office  3,555,030
Patented Jan. 12, 1971

3,555,030
MUSCLE RELAXANT AND ANALGESIC
COMPOSITIONS
Bernard Loev, Broomall, and Edward Macko, Philadelphia, Pa., assignors to Smith Kline & French Laboratories, Philadelphia, Pa., a corporation of Pennsylvania
No Drawing. Continuation of application Ser. No. 215,523, Aug. 8, 1962. This application Nov. 25, 1964, Ser. No. 413,957
Int. Cl. A61u 27/00
U.S. Cl. 260—289                                            8 Claims

ABSTRACT OF THE DISCLOSURE

This invention relates to pharmaceutical compositions having muscle relaxant and analgesic activity and to a method of producing muscle relaxation and analgesia. In addition this invention relates to new carbostyril compounds having muscle relaxant and analgesic activity.

---

This application is a continuing application of Ser. No. 215,523 filed Aug. 8, 1962, now abandoned.

The pharmaceutical compositions according to this invention comprise a pharmaceutical carrier and, as the active ingredient, a carbostyril compound having the following formula:

FORMULA I when:
Y represents —CH=CH— or —CH$_2$—CH$_2$;
X represents oxygen or sulfur;
R represents hydrogen, halogen, hydroxy, nitro, amino, mono-lower alkylamino, di-lower alkylamino, acetamido, trifluoromethyl, lower alkyl, lower alkoxy or ethoxycarbonyl;
R$_1$ represents hydrogen or, together with R, dihalogen, dihydroxy, di-lower alkoxy or methylenedioxy; and
R$_2$ represents lower alkyl, or, when Y is —CH$_2$CH$_2$—, hydrogen.

Further objects of this invention are pharmaceutical compositions comprising a pharmaceutical carrier and 4 - chloro-1-methylcarbostyril or 4 - methoxy-1-methylcarbostyril as the active ingredient.

Advantageous compositions of this invention contain, as the active ingredient, carbostyril compounds of the formula:

FORMULA II when:
R represents hydrogen, trifluoromethyl or chloro; and
R$_2$ represents lower alkyl.
A particularly advantageous composition comprises a pharmaceutical carrier and 1 - methyl-6-trifluoromethylcarbostyril.

The novel carbostyril compounds which are also objects of this invention are represented by the following formula:

FORMULA III when:
Y represents —CH=CH— or —CH$_2$—CH$_2$—;
X represents oxygen or sulfur and
R$_2$ represents lower alkyl or, when Y is
—CH$_2$—CH$_2$—
hydrogen.

The CF$_3$ moiety is preferably in a position β to the hetero ring, i.e. in the 6 or 7 position, advantageously in the 6-position.

The terms "lower alkyl" and "lower alkoxy" where used herein denote groups having 1–4 carbon atoms, preferably one carbon atom and "halogen" denotes chloro, bromo or fluoro.

The carbostyril compounds are prepared by the following procedures or by other methods known to the art.

I

The terms R and R$_1$ are as defined above, R$_2$ is lower alkyl and X is an anion.

II

The terms R and R$_1$ are as defined above.

According to procedure I above, a quaternary salt of a quinoline is oxidized, for example by use of potassium ferricyanide and sodium hydroxide solution to give the N-lower alkylcarbostyril. Hydrogenation of the carbostyril gives the 3,4-dihydrocarbostyril derivative.

By procedure II an o-nitrobenzaldehyde is condensed with malonic acid and the resulting o-nitrocinnamic acid is hydrogenated and treated with a mineral acid, such as hydrochloric acid to give the N-unsubstituted carbostyrils.

The thiocarbostyrils are prepared by treating the corresponding carbostyril compound with phosphorus pentasulfide.

The pharmaceutical compositions according to this invention comprise, in dosage unit form, a pharmaceutical carrier and a carbostyril compound as represented by Formula I in an amount sufficient to produce muscle relaxation and analgesia.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tabletted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampule or in a liquid suspension.

The method of producing muscle relaxation and analgesia in accordance with this invention comprises administering internally to animals a composition comprising a carbostyril compound as represented by Formula I, preferably admixed with a pharmaceutical carrier, for example, any of the above described carriers. The active ingredient, i.e. the carbostyril compound, is present in an amount sufficient to produce muscle relaxation and analgesia.

The composition according to this invention will, preferably, contain the carbostyril compound in an amount of from about 25 mg. to about 250 mg., advantageously from amout 50 mg. to about 150 mg. per dosage unit. The administration may be parenterally or orally. Advantageously, equal doses will be administered one to four times daily. Preferably the daily dosage regimen will be from about 50 mg. to about 600 mg. and advantageously from about 100 mg. to about 450 mg. of active medicament in pharmaceutical forms. When the administration described above is carried out, muscle relaxation and analgesia are produced.

The following examples are not limiting but are illustrative of the invention.

Example 1

A solution of 85.7 g. of 6-trifluoromethylquinoline in chloroform is treated with 60.5 g. of methyl sulfate. The resulting mixture is refluxed for one hour, concentrated in vacuo and the residue treated with acetone and ether and filtered to give the methosulfate salt of 6-trifluoromethylquinoline, M.P. 135–138° C.

To a stirred mixture of 180 g. of potassium ferricyanide in 700 ml. of water and 1.8 l. of 5% sodium hydroxide solution is added a solution of 73.5 g. of 6-trifluoromethylquinoline methosulfate in 350 ml. of water, keeping the solution at −5° C. The reaction mixture is allowed to warm to 10° C., then filtered. The solid material is recrystallized from hexane to give 1-methyl-6-trifluoromethylcarbostyril, M.P. 85–89° C.

Example 2

To a mixture of 7.6 g. of 1-methyl-6-trifluoromethylcarbostyril and 7.5 g. of phosphorus pentasulfide is added 30 ml. of pyridine. The resulting mixture is refluxed for two hours, then is poured onto ice and extracted with chloroform and methylene chloride. The organic layer is extracted with water, dried over magnesium sulfate, filtered and concentrated to give a solid which is recrcystallized from ethanol to give 1-methyl-6-trifluoromethylthiocarbostyril, M.P. 165–167° C.

Example 3

Five grams of 1-methyl-6-trifluoromethylcarbostyril in ethanol solution are hydrogenated in the presence of Raney nickel for 5–6 hours at 1000 p.s.i. The mixture is filtered and the filtrate is concentrated to give a solid material which is recrystallized from petroleum ether to give 3,4 - dihydro - 1 - methyl - 6 - trifluoromethylcarbostyril, M,P. 47–49° C.

Treating the above prepared carbostyril derivative with phosphorus pentasulfide as in Example 2 gives 3,4-dihydro-1-methyl-6-trifluoromethylthiocarbostyril.

Example 4

A solution of 19.7 g. of 6-trifluoromethylquinoline in acetic acid is treated with an excess of 30% hydrogen peroxide. The resulting mixture is heated at 80–85° C. for 10 hours, then cooled and concentrated in vacuo. The residue is neutralized with sodium carbonate and extracted with chloroform. Concentration of the extract gives the N-oxide of 6-trifluoromethylquinoline.

The above prepared N-oxide is heated with acetic anhydride for 24 hours. The mixture is concentrated, boiled with water and then extracted with ethyl acetate. The extract is dried and concentrated. The residue is hydrogenated in ethanol at 50° C. at 1500 p.s.i. using Raney nickel as catalyst to give 3,4-dihydro-6-trifluoromethylcarbostyril.

By the procedure of Example 2, the above prepared carbostyril compound is treated with phosphorus pentasulfide to give 3,4-dihydro-6-trifluoromethylthiocarbostyril.

Example 5

| Ingredients: | Amounts, mg. |
|---|---|
| 1-Methyl-6-trifluoromethylcarbostyril | 100 |
| Sucrose | 200 |
| Starch | 25 |
| Talc | 5 |
| Stearic acid | 2 |

The active ingredient and the sucrose are mixed and granulated with 10% gelatin solution. The wetted mass is passed through a #6 U.S. mesh screen directly onto drying trays. The granules are dried and passed through a #20 U.S. mesh screen. These granules are then mixed with the starch, talc, and stearic acid, passed through a #60 U.S. mesh screen and then compressed into tablets.

One tablet is administered three times a day.

Example 6

| Ingredients: | Amounts, mg. |
|---|---|
| N-Methylcarbostyril | 50 |
| Lactose | 100 |

Screen the ingredients through a #40 mesh screen, transfer to mixer, mix well and fill into a #0 hard gelatin capsule.

One capsule is administered three times a day.

Example 7

| Ingredients: | Amounts, mg. |
|---|---|
| 6-chloro-1-methylcarbostyril | 50 |
| Peanut oil | 125 |

The ingredients are mixed into a thick slurry and filled into a soft gelatin capsule.

Example 8

| Ingredients: | Amounts, mg. |
|---|---|
| 4-chloro-1-methylcarbostyril | 25 |
| Lactose | 150 |

Example 9

| Ingredients: | Amounts, mg. |
|---|---|
| 4-methoxy-1-methylcarbostyril | 75 |
| Lactose | 125 |
| Magnesium stearate | 5 |

The ingredients are mixed and filled into capsules.

What is claimed is:

1. The method of producing muscle relaxation and analgesia in animals which comprises administering internally to animals, in an amount sufficient to produce said activities, a carbostyril compound having the formula:

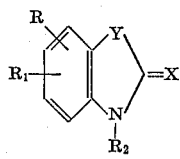

in which:
Y is a member selected from the group consisting of —CH=CH— and —CH₂—CH₂—;
X is a member selected from the group consisting of oxygen and sulfur;
R is a member selected from the group consisting of hydrogen, halogen, hydroxy, nitro, amino, mono-lower alkylamino, di-lower alkylamino, acetamido, trifluoromethyl, lower alkyl, lower alkoxy and ethoxycarbonyl;
R₁ is a member selected from the group consisting of hydrogen and, together with R, dihalogen, dihydroxy, di-lower alkoxy and methylenedioxy, R and R₁ being adjacent when they are methylenedioxy; and
R₂ is a member selected from the group consisting of lower alkyl and, when Y is —CH₂—CH₂—, hydrogen.

2. The method in accordance with claim 1 characterized in that the carbostyril compound is administered in a daily dosage regimen of from about 50 mg. to about 600 mg.

3. The method in accordance with claim 1 characterized in that the carbostyril compound is administered in a daily dosage regimen of from about 100 mg. to about 450 mg.

4. The method of producing muscle relaxation and analgesia, in animals which comprises administering internally to animals 1-methyl-6-trifluoromethylcarbostyril in an amount sufficient to produce said activities.

5. The method of producing muscle relaxation and analgesia in animals which comprises administering internally to animals N-methylcarbostyril in an amount sufficient to produce said activities.

6. A chemical compound of the formula:

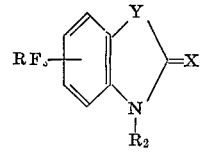

in which:
Y is a member selected from the group consisting of —CH=CH— and —CH₂—CH₂—;
X is a member selected from the group consisting of oxygen and sulfur and
R₂ is a member selected from the group consisting of lower alkyl and, when Y is —CH₂—CH₂—, hydrogen.

7. A chemical compound of the formula:

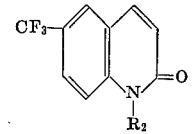

in which R₂ is lower alkyl.

8. A chemical compound of the formula:

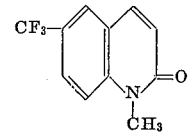

References Cited

UNITED STATES PATENTS 3,210,358  10/1965  Pfister _____ 167—65N

OTHER REFERENCES

Chem. Abst., vol. 48 p. 2727(b–c), 1954.
Chem. Abst., vol. 48, p. 11417(d), 1954.
Chem. Abst., vol. 47, p. 3314(b), 1953.
Chem. Abst., vol. 50, p. 1817(y), 1956.

STANLEY J. FRIEDMAN, Primary Examiner

U.S. Cl. X.R.
260—283; 424—258

PO-1050
(5/69)

UNITED STATES PATENT OFFICE
CERTIFICATE OF CORRECTION

Patent No. 3,555,030　　　　　　　　Dated January 12, 1971

Inventor(s) Bernard Loev and Edward Macko

It is certified that error appears in the above-identified patent and that said Letters Patent are hereby corrected as shown below:

Column 6, line 7, that portion of the formula reading " $RF_3-$ " should read --- $CF_3-$ ---.

Signed and sealed this 20th day of April 1971.

(SEAL)
Attest:

EDWARD M. FLETCHER, JR.　　　　　WILLIAM E. SCHUYLER, J
Attesting Officer　　　　　　　　　Commissioner of Patent